United States Patent [19]
Maeda et al.

[11] Patent Number: 5,839,110
[45] Date of Patent: Nov. 17, 1998

[54] TRANSMITTING AND RECEIVING APPARATUS

[75] Inventors: Yuji Maeda, Tokyo; Masayuki Nishiguchi, Kanagawa; Kentaro Odaka, Tokyo, all of Japan

[73] Assignee: Sony Corporation, Tokyo, Japan

[21] Appl. No.: 624,645

[22] PCT Filed: Aug. 2, 1995

[86] PCT No.: PCT/JP95/01537

§ 371 Date: Jun. 13, 1996

§ 102(e) Date: Jun. 13, 1996

[87] PCT Pub. No.: WO96/06489

PCT Pub. Date: Feb. 29, 1996

[30] Foreign Application Priority Data

Aug. 22, 1994 [JP] Japan ................................. 6-196613

[51] Int. Cl.[6] .................. G10L 3/00; G10L 3/02; G10L 5/06; G10L 9/00
[52] U.S. Cl. .................. 704/275; 704/210; 704/215; 704/233; 704/246
[58] Field of Search .................. 704/215, 210, 704/211, 214, 233, 246, 275

[56] References Cited

U.S. PATENT DOCUMENTS

| 5,111,501 | 5/1992 | Shimanuki | 704/215 |
| 5,157,728 | 10/1992 | Schorman et al. | 704/215 |
| 5,553,190 | 9/1996 | Ohya | 704/201 |

FOREIGN PATENT DOCUMENTS

| 56-150798 | 11/1981 | Japan | 704/201 |
| 61-274522 | 12/1986 | Japan | 704/201 |
| 61-275900 | 12/1986 | Japan | 704/201 |
| 63-136835 | 6/1988 | Japan | 704/201 |
| 64-65932 | 3/1989 | Japan | 704/201 |
| 3-24839 | 11/1991 | Japan | 704/201 |
| 4-923 | 1/1992 | Japan | 704/201 |

*Primary Examiner*—David R. Hudspeth
*Assistant Examiner*—Robert Louis Sax
*Attorney, Agent, or Firm*—Jay H. Maioli

[57] ABSTRACT

An input speech signal is compressed and encoded by a speech encoding unit 3 and sent to an RF transmission processing unit 4 where it is channel-encoded, modulated and transmission-processed so as to be transmitted over an antenna 11. A signal received over the antenna 11 is reception-processed, demodulated and channel-decoded so as to be expanded and decoded a speech decoding unit 6. A recording/playback control unit 8 controls writing of a signal from the speech encoding unit 3 to a semiconductor memory 7 or readout of a signal from the semiconductor memory 7 to the speech encoding unit 3. This enables the semiconductor memory 7 to be efficiently utilized in single/dual communication without increasing the circuit construction.

23 Claims, 9 Drawing Sheets

FIG.4(A)

| | | | | |
|---|---|---|---|---|
| | | | LAR1 | 1 |
| | | | LAR2 | 2 |
| | | | LAR3 | 3 |
| | | | LAR4 | 4 |
| | | | LAR5 | 5 |
| | | | LAR6 | 6 |
| | | | LAR7 | 7 |
| | | | LAR8 | 8 |

FIG.4(B)

| | LAR1 |
|---|---|
| | LAR2 |
| | LAR3 |
| | LAR4 |
| LAR5 | LAR6 |
| LAR7 | LAR8 |

FIG.4(C)

| | | | | |
|---|---|---|---|---|
| | | | Nn | 1 |
| | | | bn | 2 |
| | | | Mn | 3 |
| | | | Xmaxn | 4 |
| | | | xn(0) | 5 |
| | | | xn(1) | 6 |
| | | | xn(2) | 7 |
| | | | xn(3) | 8 |
| | | | xn(4) | 9 |
| | | | xn(5) | 10 |
| | | | xn(6) | 11 |
| | | | xn(7) | 12 |
| | | | xn(8) | 13 |
| | | | xn(9) | 14 |
| | | | xn(10) | 15 |
| | | | xn(11) | 16 |
| | | | xn(12) | 17 |

FIG.4(D)

| | Nn |
|---|---|
| bn | Xmaxn |
| Mn | xn(0) |
| xn(1) | xn(2) |
| xn(3) | xn(4) |
| xn(5) | xn(6) |
| xn(7) | xn(8) |
| xn(9) | xn(10) |
| xn(11) | xn(12) |

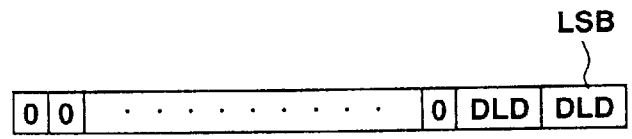
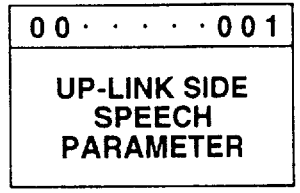
FIG.5(a)
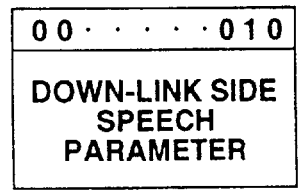
FIG.5(b)
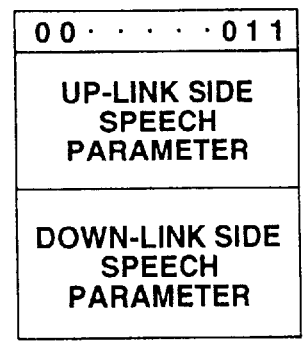
FIG.5(c)
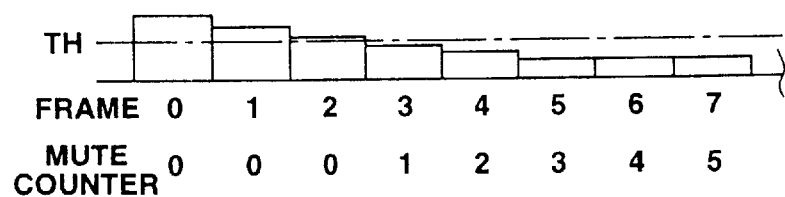
FIG.6

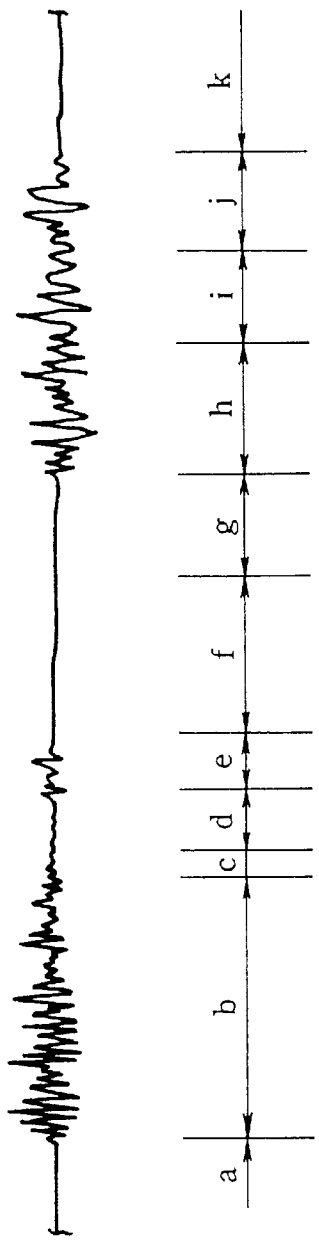
FIG.9(A) RECEIVING SIDE (DOWN-LINK)
FIG.9(B) SPEAKING SIDE (UP-LINK)

TRANSMITTING AND RECEIVING APPARATUS

TECHNICAL FIELD

This invention relates to a transmitting and receiving apparatus for speech signals employing a radio telephone network, such as a car telephone set or a portable telephone set. More particularly, it relates to a transmitting and receiving apparatus conveniently applied to a telephone set for a digital radio telephone network configured for transmission and reception of digital data.

BACKGROUND ART

As a telephone for communication during movement utilizing a radio telephone network, a variety of car telephone or portable telephone sets have been developed. The car telephone and portable telephone sets are managed at the outset by a communication system utilizing analog communication. This communication system, which scrambles signals by various signal processing techniques such as frequency interchanging, suffers from problems in connection with confidentiality in communication since radio signals may be easily intercepted by simple signal processing. Thus the producers have developed a telephone set by digital radio network which effects communication by radio transmission of digital data.

On the other hand, a variety of so-called automatically answering telephone sets, having a recording/reproducing unit built therein for recording/reproducing the contents of conversations, have been developed. With the automatic answering telephone set, a tape recorder is built in the telephone set. With the tape recorder enclosed in the telephone unit, the function of the unit is improved, since the message from the remote party is recorded in the absence of the telephone set owner or the message desired to be imparted may be pre-recorded and imparted to the remote party.

There has also been developed a telephone set of the so-called solid state recording system in which speech parameters compressed from the speech signals are directly recorded or in which the speech parameters are variable-length encoded and recorded on a small-sized semiconductor memory.

With the above-described semiconductor memory, having a limited storage capacity, it is only possible to records a conversation continuing for only a pre-set time duration even using speech parameters compressed from the speech signals.

However, the present state of the art is such that, when recording the speech signals from the remote responding party or the transmitting party, the silent period, during which none of the parties is talking, is also recorded. For effective recording of the conversation with the limited storage capacity, it becomes necessary to make more effective recording during bidirectional or unidirectional communication such as by lowering the recording rate during such silent period.

In particular, during the double talk, that is the state in which, on reproducing the signals transmitted from an up-link and a down-link, signals from the up-link and those from the down-link co-exist in superposition on reproduction, recording needs to be made in both directions, so that recording needs to be performed in a more effective manner.

In view of the foregoing, it is an object of the present invention to provide an apparatus for transmission and reception of speech signals whereby the pre-set recording capacity may be efficiently utilized in the bidirectional/unidirectional communication without increasing the circuit construction.

DISCLOSURE OF THE INVENTION

According to the present invention, there is provided a speech signal transmitting/receiving apparatus having compressing and encoding means, such as a speech encoder, for compressing and encoding an input speech signal, transmitting means for transmission processing an output signal of the compressing and encoding means, receiving means for reception processing a received signal, expansion decoding means for expanding and decoding an output signal of the receiving means for outputting a speech signal, storage means for storing a signal from the compressing encoding means and/or a signal to the expanding and decoding means, and control means for controlling writing of the signal from the compressing and encoding means and/or the signal to the expanding and decoding means and for controlling the readout operation from the storage means.

The signal from the compressing encoding means and/or the signal to the expanding decoding means may be code data, such as speech parameters. Preferably, the control means inhibits signal storage or recording, and records a signal indicating the silent period when the signal from the compressing encoding means and/or the signal to the expanding decoding means is in the silent state.

It is sufficient if the control means judges, based upon the signal from the compressing encoding means and/or expanding decoding means, whether or not the dual (bidirectional) mode prevails and, if the control means stores the uplink or downlink side signal or the same signal in the storage means in case there prevails the dual mode.

If code data of a signal, such as speech parameters, are stored, preferably the code data is further compressed and stored in the storage means.

In this manner, speech data may be efficiently recorded without annexing additional circuitry, while the speech of the uplink and downlink side networks may be efficiently recorded with a bit rate corresponding to approximately one network.

BRIEF DESCRIPTION OF THE DRAWINGS

FIG. 4 illustrates the recording format of speech parameters recorded in a speech-recording memory.

FIG. 5 illustrates the recording structure of the speech-recording memory.

FIG. 6 is a diagrammatic view for illustrating the operation of a mute counter.

FIGS. 9A and 9B illustrate the relation of association between the algorithm and the communication sections dividing the waveform patterns of waveform signals supplied to the downlink and uplink sides of a portable telephone set.

BEST MODE FOR CARRYING OUT THE INVENTION

Figure 1:
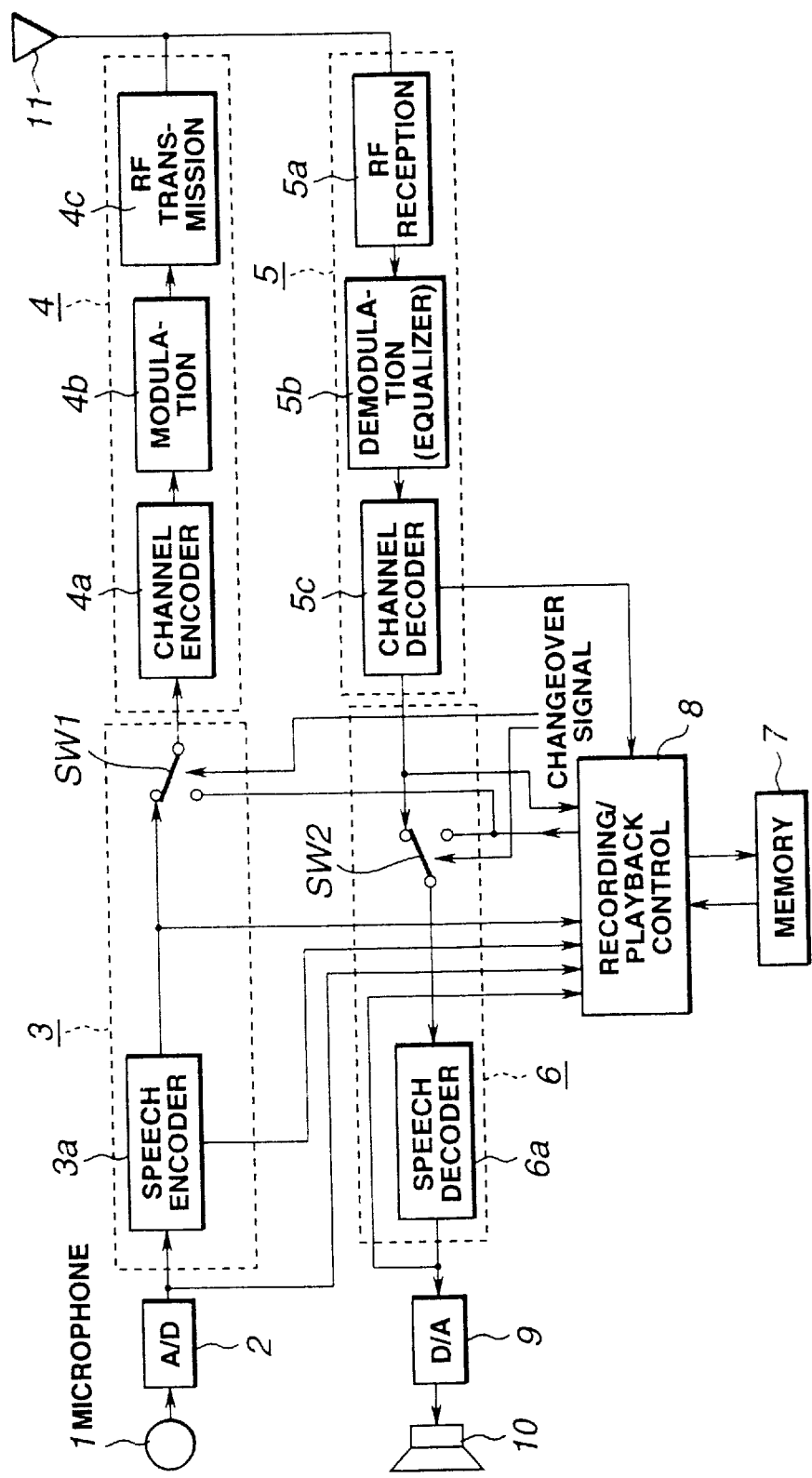
FIG. 1 is a schematic block circuit showing the constitution of a portable telephone set to which the transmission/reception apparatus according to the present invention is applied.

Referring to the drawings, a speech signal transmitting/receiving apparatus, as a preferred form of the execution of the invention, is explained by referring to the drawings. The speech signal transmitting and receiving apparatus will be explained by taking an example of a portable telephone set of the full duplex system, that is a duplex operation system for carrying out reciprocal communication by simultaneous transmission and reception, conveniently applied to e.g., a digital cellular. This portable telephone set is employed as a terminal and communication with the base station is carried out by exchange of digital data compressed by high efficiency encoding of speech signals.

The portable telephone set converts speech signals of the transmitting side into electrical signals for transmitted signals over a microphone 1. This portable telephone set supplies electrical signals from the microphone 1 to an A/D converter 2 for transmitting signals as digital signals.

The portable telephone set includes a speech encoder 3 for encoding an output signal of the A/D converter 2, as an input speech signal, for compression, an RF transmission processor 4 for transmission-processing an output signal of the speech encoder 3, an RF reception processor 5 for reception-processing a modulated input signal supplied to the receiving side, a speech decoder 6 for expanding and decoding an output signal of the RF reception processor 5 for outputting the speech signal, a semiconductor memory 7 for recording transmission/reception signals from the speech encoder 3 and/or the speech decoder 6, and a recording/playback controller 8 for controlling the semiconductor memory 7 responsive to the transmitted and received signals.

The speech decoder 6 supplies expanded and decoded signals to a D/A converter 9. The D/A converter 9 converts digital signals supplied from the remote responding party into analog signals which are outputted to a speaker 10. The speaker 10 converts the analog signals supplied thereto into speech. Thus the portable telephone set processes speech signals and transmits the processed speech signals to the remote party while receiving the speech from the remote party to permit conversation between the parties.

The constitution of various components is briefly explained.

The speech encoder 3 is made up of a speech encoding circuit 3a and a changeover switch SW1. The speech encoder 3 high-efficiency encodes digital data supplied from the A/D converter 1 and sends the resulting encoded data, such as encoded parameters, to the RF transmission processor 4. The changeover switch SW1 is responsive to changeover signals supplied as a result of actuation by the user of a key switch provided on the portable telephone set to select one of the recording and playback sides for speech.

As the compression/encoding methods utilized for the speech encoding circuit 3a of the speech encoder 3, there are a variety of encoding methods known for signal compression by taking advantage of statistic properties in the time domain or frequency domain of audio signals (inclusive of speech signals and acoustic signals) and psychoacoustic characteristics of the human auditory system. Specific examples of high efficiency encoding of speech signals include multi-band excitation (MBE) encoding, single band excitation (SBE) encoding, harmonic encoding, sub-band coding (SBC), linear predictive coding (LPC), discrete cosine transform (DCT), modified (DCT)(MDCT) and fast Fourier transform (FFT). For encoding, various information data, more generally, encoded data, such as amplitudes of spectral components or parameters thereof, such as LSP parameters, α-parameters or k-parameters, are employed. Recently, code excited linear predictive (CELP) coding, vector sum excited linear predictive (VSELP) coding, pitch synchronous innovation-CELP encoding, or regular pulse excitation—long term prediction (RPE-LTP) coding, have become known as the speech encoding systems for the digital portable telephone system These encoding systems may also be employed for the speech encoding circuit 3a of the speech encoder 3. In the following description, encoded data obtained by the above-described various speech encoding systems are typified by speech parameters or parameters for explanation sake.

The RF transmission processor 4 is made up of a channel encoder 4a, a modulation circuit 4b and an RF transmission processing circuit 4c.

The RF transmission processor 4 is configured so that digital data compressed by high efficiency encoding by the above constitution, that is the encoded data, such as encoded speech parameters, are sent via the channel encoder 4a to the modulating circuit 4b where it is modulated and transmitted via the RF signal processing circuit 4c and an antenna 11 as RF signals to a base station.

The present portable telephone set also has its RF reception processor 5 supplied with RF signals from the base station over the antenna 11. The RF signal processor 5 is made up of an RF reception processing circuit 5a, a demodulating circuit 5b and a channel decoder 5c.

The RF reception processor 5 performs reception processing on the received RF signals in the RF reception processing circuit. 5a and transmits the reception-processed signals to the demodulation circuit 5b. The demodulation circuit 5b equalizes and waveform-shapes the signal from the RF reception circuit 5a and transmits the resulting signals to the channel decoder 5c. The channel decoder 5c transmits a voice activity flag from e.g., the down-link side to the recording/playback controller 8, while supplying encoded digital data, that is speech parameters, compressed by high efficiency encoding, to a speech decoding unit 6.

The speech decoding unit 6 is made up of a changeover switch SW2 and a changeover switch 6a. Similarly to the changeover switch SW1, the changeover switch SW2 is responsive to changeover signals supplied as a result of actuation by the user of a key switch provided on the portable telephone set to select one of the recording and playback sides for speech. The speech decoder 6 expands and decodes the digital data, that is the speech parameters, more generally code data, compressed by high-efficiency encoding, and outputs the resulting data to the D/A converter 9. The D/A converter 9 converts the digital data supplied thereto into analog signals which are sent to the speaker 10 of a handset. The speaker 10 converts the speech signals from the remote party into speech which is pronounced as speech.

On the other hand, the recording/playback controller 8 is constituted by the CPU or DSP, while the semiconductor memory is constituted by e.g., a RAM. The memory 7 is responsive to control by the recording/playback controller 8 in order to permit recording/reproduction. The memory 7 is of a capacity to permit recording continuing for e.g., N seconds for both unidirectional communication and bidirectional communication. However, since the talk in both directions needs to be recorded on the occurrence of double talk, a memory is employed which has a memory space capable of recording substantially for N+α seconds, where a<N.

The recording/playback controller 8 is fed with compressed speech parameters from the speech encoding circuit 3a and compressed speech parameters to the speech decoding circuit 6a. The recording/playback controller 8 is fed from the speech encoding circuit 3a and the channel decoder 5 with voice activity flags specifying the presence or absence of speech signals for recording/reproduction. The recording/playback controller 8 is responsive to the voice activity flags to perform voice/unvoiced selection recording control on the supplied speech parameters in accordance with the algorithm which will be explained subsequently.

If the recording/playback controller 8 effectuates level detection of the speech signals responsive to output signals of the A/D converter 2 and the speech decoding circuit 6a, the recording/reproducing controller 8 is not in need of the voice activity flag. In addition, if the recording/playback controller 8 is capable of detecting the signal level from the compressed speech parameters, it is similarly not in need of the output signals from the A/D converter 2 or the speech decoding circuit 6a. The recording/playback controller 8 sends the compressed speech parameters supplied thereto to the memory 7 for controlling the recording.

Figure 2:
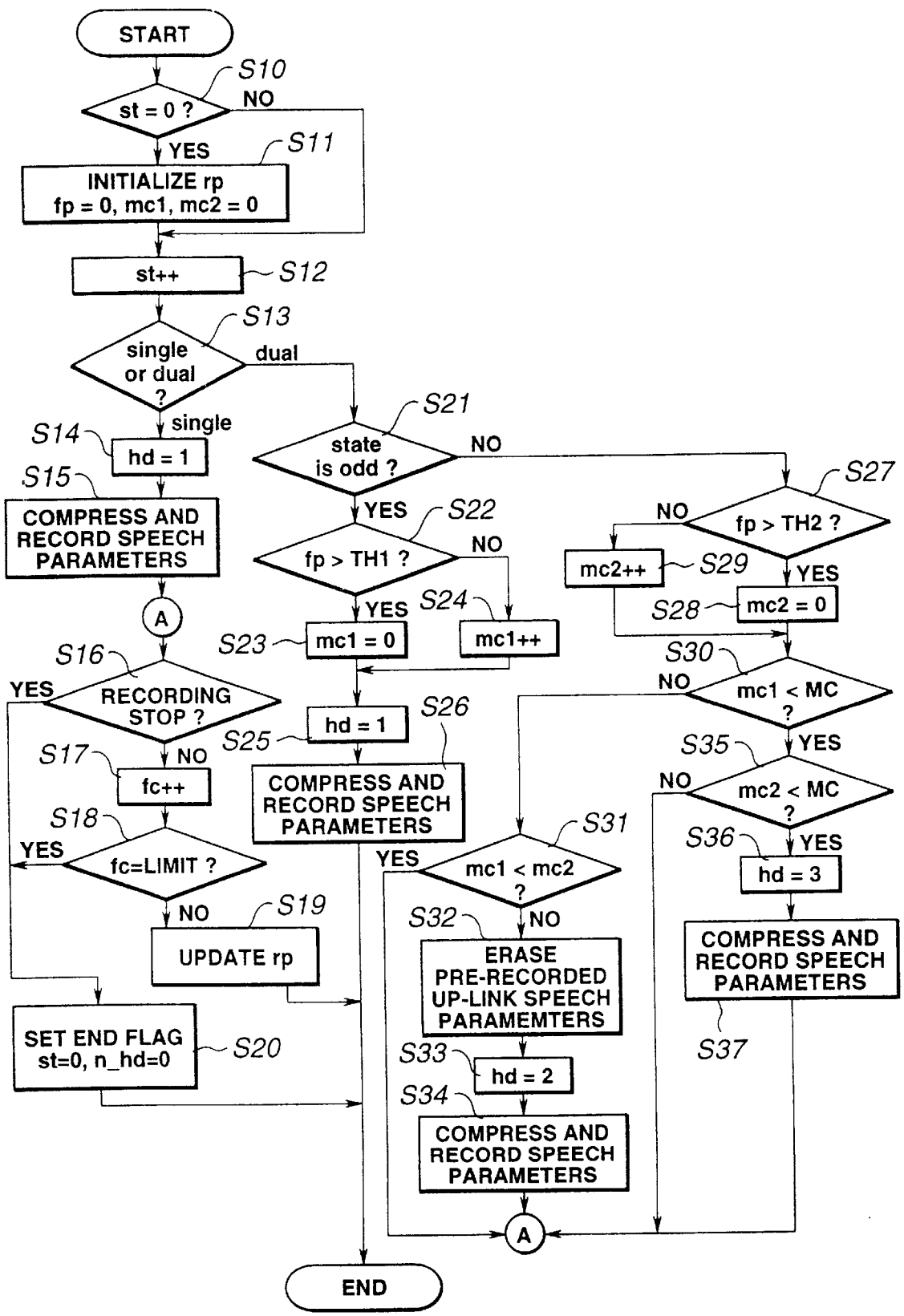
FIG. 2 is a flow chart for illustrating the recording operation of the portable telephone set.
Figure 3:
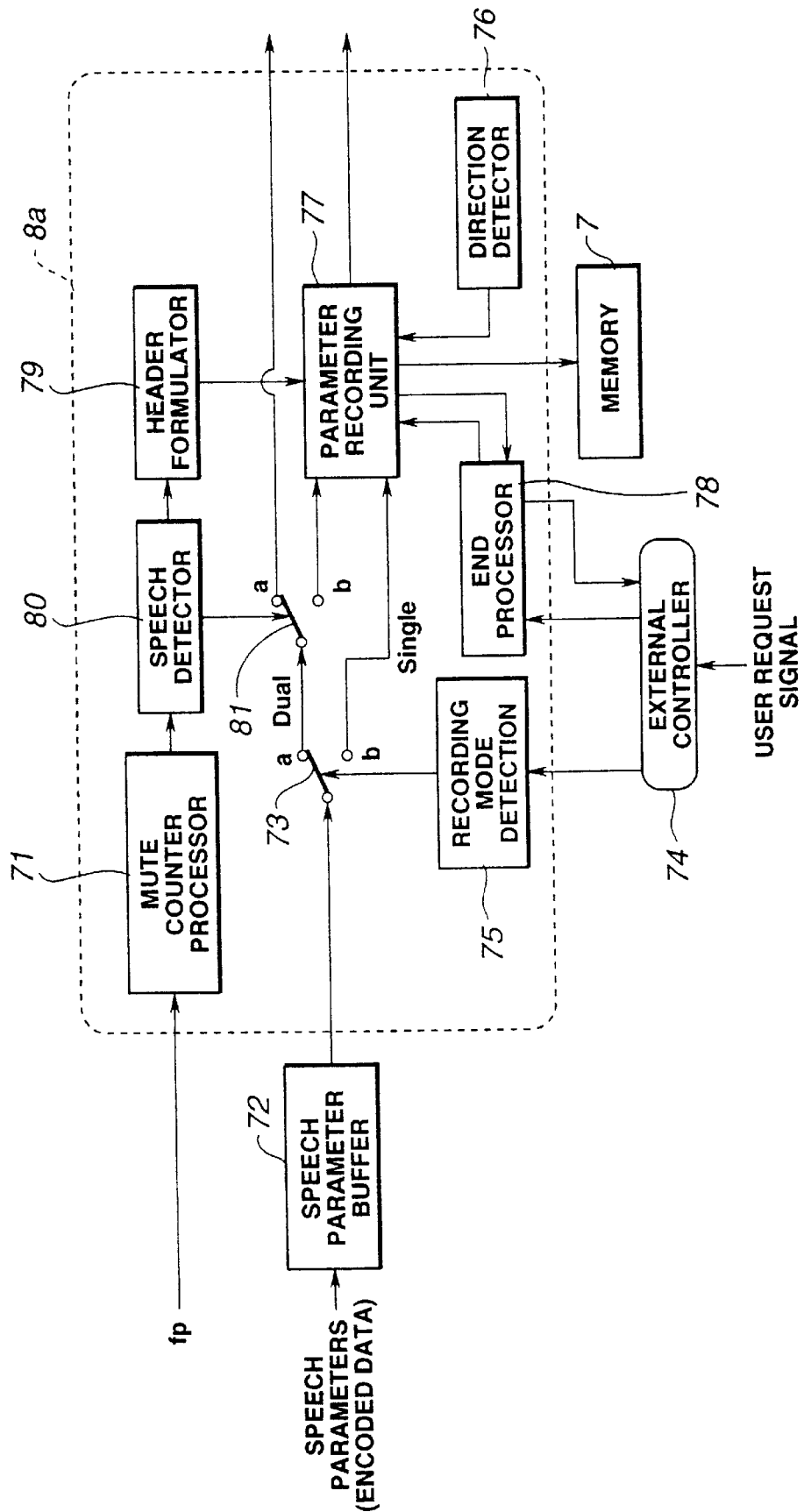
FIG. 3 is a functional block circuit showing a recording controller and a peripheral circuit of a recording/reproduction control unit.

The recording function of the portable telephone set is explained by referring to the flow chart of FIG. 2, the functional block diagram of FIG. 3 and occasionally to the block diagram of FIG. 1.

It should be noted that the recording/playback controller 8 of FIG. 1 implements the recording function as later explained by software using CPU or DSP, and FIG. 3 represents the function in the form of functional blocks. Of course, the recording function of the recording/playback controller 8 may also be constituted by hardware as shown in FIG. 3.

Referring to FIG. 3, showing the recording controller 8a of the recording/playback controller 8 of FIG. 1 and its peripheral circuit, the frame energy level or frame power fp of the speech signals supplied to the circuit of FIG. 1 is supplied to a mute counter processor 71 of the recording controller 8a. The speech. parameters from the speech encoding circuit 3a of FIG. 1, more generally the encoded data, are sent via a speech parameter buffer 72 to a common fixed terminal of the switch 73.

The portable telephone set has states proper to the recording function. For the non-recording state, the state value st is set to 0 (st=0). For the recording state, the state value is set to a value other than 0.

If a user request signal, herein a recording request signal, is sent from the user of the portable telephone set via an external controller 74 by corresponding key actuation, the recording controller 8a is responsive to the recording request signal to set a flag specifying a unidirectional communication or a bidirectional communication at a pre-set position. The recording controller 8a then accesses a recording routine (sub-routine).

The recording routine thus accessed performs status check of the recording function at step S10 of FIG. 2. If, at step S10, the current state is 0 (YES), the recording controller transfers to step S11 and, if otherwise (NO), the recording controller transfers to step S12.

At step S11, the recording controller first initializes the recording pointer (rp). Second, the recording controller sets the value of the frame counter fc to 0 (fc=0) and, third, it sets the value of the bidirectional mute counter mc to 0 (mc1=mc2=0). The mute counter will be explained subsequently.

At step S12, the state value st is incremented by 1 (st$^{++}$) before the recording controller transfers to step S13.

At step S13, it is judged from the set flag value whether the recording is single (unidirectional) or dual (bidirectional). If the setting is single, that is for unidirectional recording, the recording controller transfers to step S14 for setting 1 in a header hd of the speech parameter. If the setting is dual, that is for bidirectional recording, the recording controller transfers to step S21. This corresponds to detection by a recording mode detector 75 and the changeover control operation by the changeover switch 73. Thus the changeover switch 73 has its movable contact moved to a fixed terminal a and to a fixed terminal b if the recording is dual or single, respectively.

The recording structure of recording in the memory 7 is explained.

The code data, for example, speech codec parameters or speech parameters, are generally handled as being a set of parameters made up of a number of bits. Since recording in the memory is usually done with the width of 8 bits/16 bits, recording in the memory is done in accordance with a format conforming to the bit length in expectation of data compression.

FIGS. 4A to 4D show specific examples of speech parameters recorded in the memory 7. These speech parameters are usually encoded data. In the present example, the regular pulse excitation—long term prediction (RPE-LTP) is employed as the encoding method for the speech encoding circuit 3a of the speech encoder 3.

That is, FIG. 4A shows frame parameters produced for each frame of the encoding by the speech encoding circuit 3a of the RPE-LTP encoding system. In this figure, LAR1 to LAR8 denote codes obtained on logarithmic quantization of reflection coefficients obtained in turn by short-term predictive analysis of the input signal. For recording or storing these eight parameters LAR1 to LAR8 in the memory 7, the parameters LAR5 and LAR6 and the parameters LAR7 and LAR8 are written in 1-byte storage areas, as shown in FIG. 4B, for compressing the size of the storage areas of the eight parameters to 6 bytes.

FIG. 4C shows subframe parameters obtained from each of subframes resulting from division of one frame into four portions. In this figure, a parameter Nn denotes the pitch period produced between the waveform-shaping prediction residue signal and the past reproduced residue signal, and a parameter bn denotes a long-term prediction filter coefficient as produced from the pitch period Nn of the n'th subframe. A parameter Mn denotes a grid position of a pulse train selected from four sets of RPE pulse trains decimated from the long-term prediction residue signals, and a parameter Kmaxn denotes a code obtained by logarithmic quantization of the maximum amplitude of the RPE pulse train selected from the parameter Mn of the n'th subframe. Finally, parameters Xn(0) to Xn(12) denote codes obtained on normalizing the RPE pulse train by the maximum amplitude derived from the parameter Xmaxn and quantizing the normalized code. For recording or storing these 17 parameters in the memory 7, as shown in FIG. 4D, each 1-byte storage area is provided with portions for writing two parameters, as shown in FIG. 4D, for compressing the required recording capacity to 9 bytes.

The contents of the frame parameter or the subframe parameter may be known by setting a header as a portion of the recording structure within the memory 7.

As for the header of the above-described recording structure, the lower two bits specify the presence or absence of data. For example, the lower most bit and the second lowest bit of the header denote the presence or absence of up-link data and the presence or absence of down-link data, respectively.

Therefore, if "1" is set at the lower most bit, it is indicative of the presence of the up-link data (FIG. 5a), whereas, if "0" is set at the lower most bit, it is indicative of the absence of the up-link data.

Similarly, if "1" is set at the second lowest bit, it is indicative of the presence of the down-link data (FIG. 5b), whereas, if "0" is set at the second lowest bit, it is indicative of the absence of the down-link data. If there is the downlink data, 2 is set in the header, indicating that the recording is single (unidirectional).

For dual (bidirectional) recording, "1" is set in each bit position indicating the presence or absence of the uplink data and the downlink data (FIG. 5c). Thus, for dual recording, the header value becomes 3.

For single recording, the header value is set to 1 at step S14 and, at the next step S15, the speech parameters, more generally, the code data, are compressed and recorded in conformity to the bit length in the memory. That is, speech parameters are recorded in the memory 7 by the parameter recording unit 77.

If it is determined at step S13 that the recording is dual recording, the recording controller transfers to step S21 where the direction is judged depending upon whether or not the state value is odd. This direction judgment is carried out by a direction detector 76. Since the uplink/downlink is accessed alternately for dual recording, it is determined that the direction is uplink if the state value is odd. The recording controller then transfers to step S22. Conversely, if the state value is even, that is not odd (NO), the direction is determined to be downlink and the recording controller transfers to step S27.

At step S22, it is checked whether or not the frame energy level of the supplied signal is larger than a pre-set threshold value TH1. On the other hand, it is checked at step S27 whether or not the frame energy level of the supplied signal is larger than a pre-set threshold value TH2.

In connection with discrimination of the frame energy level from a pre-set threshold value, it should be noted that, if the domain of the lowered speech signal level between the uttered speech sounds is handled as silent domain, an interrupted feeling in the speech is given the remote party, even granting that the speech signal level in the human speech is significantly lowered between uttered portions of the speech. In order to reduce such ill effects, a mute counter is set for specifying the number of frames of continuous low signal levels. This corresponds to the processing performed by the mute counter processor 71.

That is, if the signal level at the end of a signal domain, for example, is lower than a pre-set threshold value TH, as shown in FIG. 6, the mute counter of the mute counter processor 71 is incremented by one.

In accordance with the above-defined rule, the portable telephone set effectuates recording unconditionally until a certain number of frames is reached, for example, until the mute counter reaches a pre-set count value MC. The count value of the mute counter is then compared to a count value of the other mute counter. The portable telephone set is controlled at this time for recording the signals associated with a smaller one of the count values of the mute counters. By such operation, no alien feeling is invoked in the reproduced speech, while saving in the memory capacity is achieved. Although the pre-set count value is the same (MC) for both directions, distinct count values may also be achieved by the minimum design change.

Specifically, if the frame energy level (frame power fp) is found by judgment at step S22 to be larger than the threshold TH1 (YES), the recording controller transfers to step S23 where 0 is substituted in the uplink side mute counter nc1. The recording controller then transfers to step S25.

If, by the judgment at step S22, the frame energy level fp is not more than the threshold value TH1 (NO), the recording controller transfers to step S24 for incrementing the value of the uplink side mute counter mc1 by 1. The processing at the steps S22 to S24 is carried out by the mute counter processor 71. The recording controller then transfers to step S25.

Since the downlink side frame energy level is unknown at step S25, the header value hd is temporarily set to 1 (hd=1), This is carried out by a header formulator 79.

At the next step S26, the speech parameters or code data are compressed as at step S15 and recorded by a parameter recording unit 77 in the memory 7. After the end of the above-described sequence of signal compressing and recording operations, the recording routine is terminated.

If the state value is found by the judgment at step S21 to be even (NO), the recording controller transfers to step S27, At this step S27, it is determined whether or not the frame energy level fp is larger than a threshold value TH2. If, by the judgment at step S27, the frame energy level fp is larger than the threshold value TH2 (YES), the recording controller transfers to step S28 in order to substitute 0 in the downlink side mute counter mc2. The recording controller then transfers to step S30.

If, by the judgment at the step S22, the frame energy level fp is found to be not more than the threshold value TH2 (NO), the recording controller transfers to step S29 in order to increment the value of the downlink side mute counter mc2 by 1 (mc2$^{++}$) The recording controller then transfers to step S31.

At step S31, it is judged whether or not the value of the uplink side mute counter mc1 is smaller than the value of the downlink side mute counter mc2. If the value of the uplink side mute counter mc1 exceeds the value of the downlink side mute counter mc2 (NO), the recording controller transfers to step S32.

The processing of the steps S30 and S31 is carried out by a speech detector 80, and the changeover switch 81 is controlled responsive to the results of judgment. The changeover switch 81 is controlled by a changeover control signal from the speech detector 80 so that its movable contact is moved to a fixed terminal b or to a fixed terminal a for sending or not sending a signal from the dual side fixed terminal a of the changeover switch 73 to the parameter recording unit 77.

At step S32, the recorded uplink side speech parameter is erased. The recording controller then transfers to step S33.

At step S33, the header value hd is set to 2 (hd=2), before the recording controller transfers to step S34. The processing of step S33 is performed by the header formulator 79.

At step S34, the downlink side speech parameter is compressed in association with the header value of 2 so as to be recorded in the memory 7. After this processing, the recording controller transfers to step S16.

If, at step S31, the uplink side mute counter mc1 is smaller than the value of the downlink side mute counter mc2 (YES), the recording controller jumps without performing the processing at steps S32 to S34 and transfers via connector A to step S16.

If, at step S30, the value of the uplink side mute counter mc1 is smaller than the pre-set value MC (YES), the recording controller transfers to step S35.

At step S35, it is judged whether or not the value of the downlink side mute counter mc2 is smaller than the pre-set value MC. This is performed by the speech detector 80. If the downlink side mute counter mc2 has a value not less than the value MC (NO), the recording controller transfers via connector A to step S16. By such transfer, no recording is made on the memory 7. That is, the changeover switch 81 has its movable contact 81 set to the fixed terminal a without supplying the speech parameters to the parameter recorder 77. If the downlink side mute counter mc2 is smaller than the value MC (YES), the recording controller transfers to step S36 where the header value hd is set by the header formulator 79 to 3 (hd=3).

At step S37, the speech parameter on the downlink side is compressed, after previous compression of the uplink side, for recording in the memory 7, by way of dual recording in association with the header value of 3. After the end of this processing, the recording controller transfers to step S16 via connector A.

The end processing downstream of the connector A in FIG. 2 is explained.

At step S16, it is checked whether or not there is a request for recording stop from the user supplied via an external controller 74. If there is no such recording stop request (NO), the recording controller transfers to step S17 to increment the value fc of the frame counter by one before the recording controller transfers to step S18. If there is such recording stop request (YES), the recording controller transfers to step S20.

At step S18, it is checked whether or not the value fc of the frame counter has reached the count value corresponding to the recording continuing for e.g., N seconds, or LIMIT. If the frame counter value has not reached LIMIT (NO), the recording controller transfers to step S19.

At step S19, the value rp of the recording pointer is updated to terminate the recording routine.

If, at step S18, the frame counter value fc has reached LIMIT (YES), the recording controller transfers to step S20.

At step S20, the end flag, supplied from the recording/playback controller 8 to the control unit, such as CPU, of the portable telephone set, is set. The value of the header of the next frame n__hd is set to 0 to terminate the recording routine.

The processing at the steps S18, S19 and S20 is performed by an end processor 78.

The value of the header of the next frame is set to 0 in consideration that it suffices to reproduce until reaching the frame with the 0 header.

By the above operation, the leading or trailing end of the pronounced speech is prevented from being dropped in order not to invoke an alien feeling on reproduction.

Figure 7:
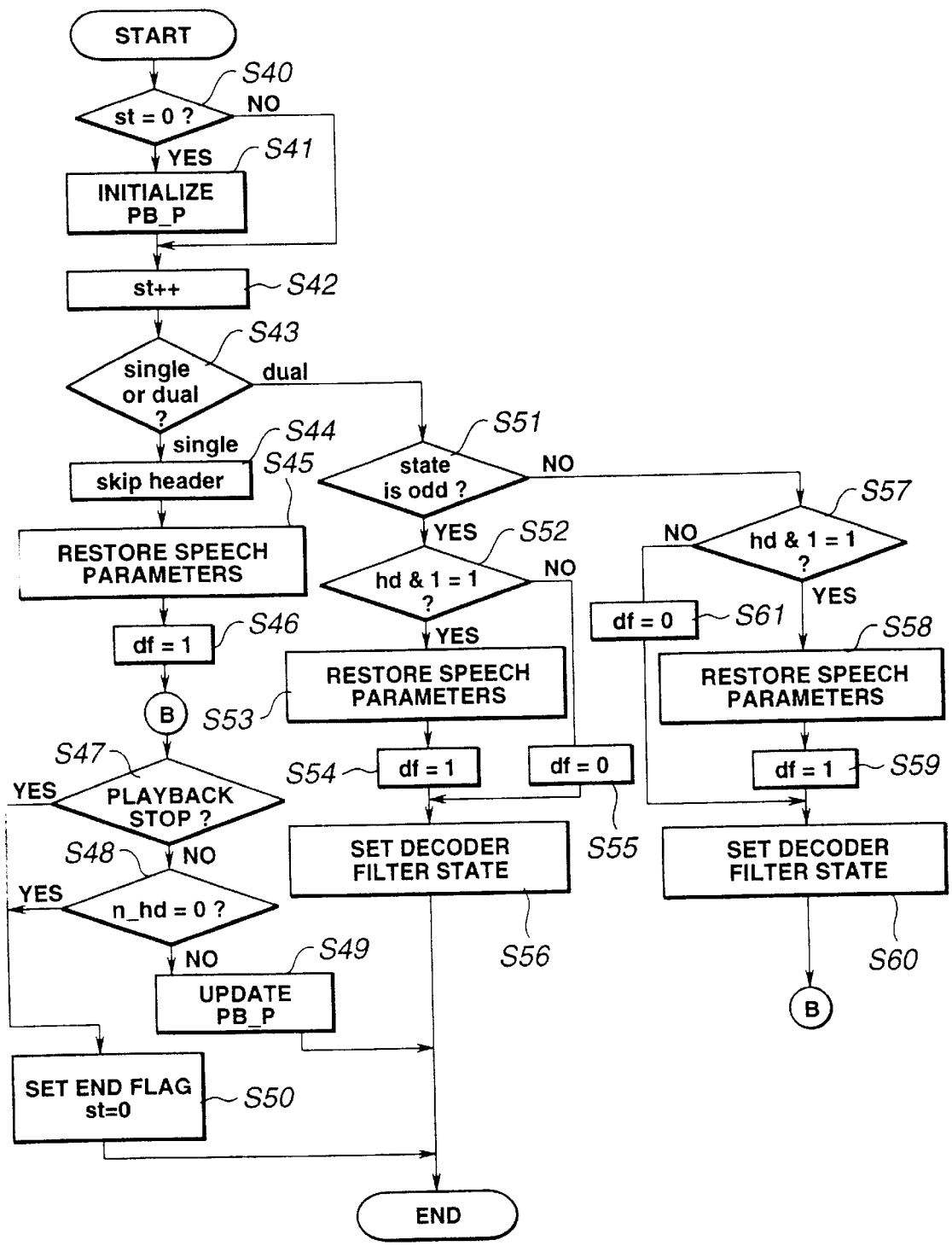
FIG. 7 is a flow chart for illustrating the playback operation in the portable telephone set.
Figure 8:
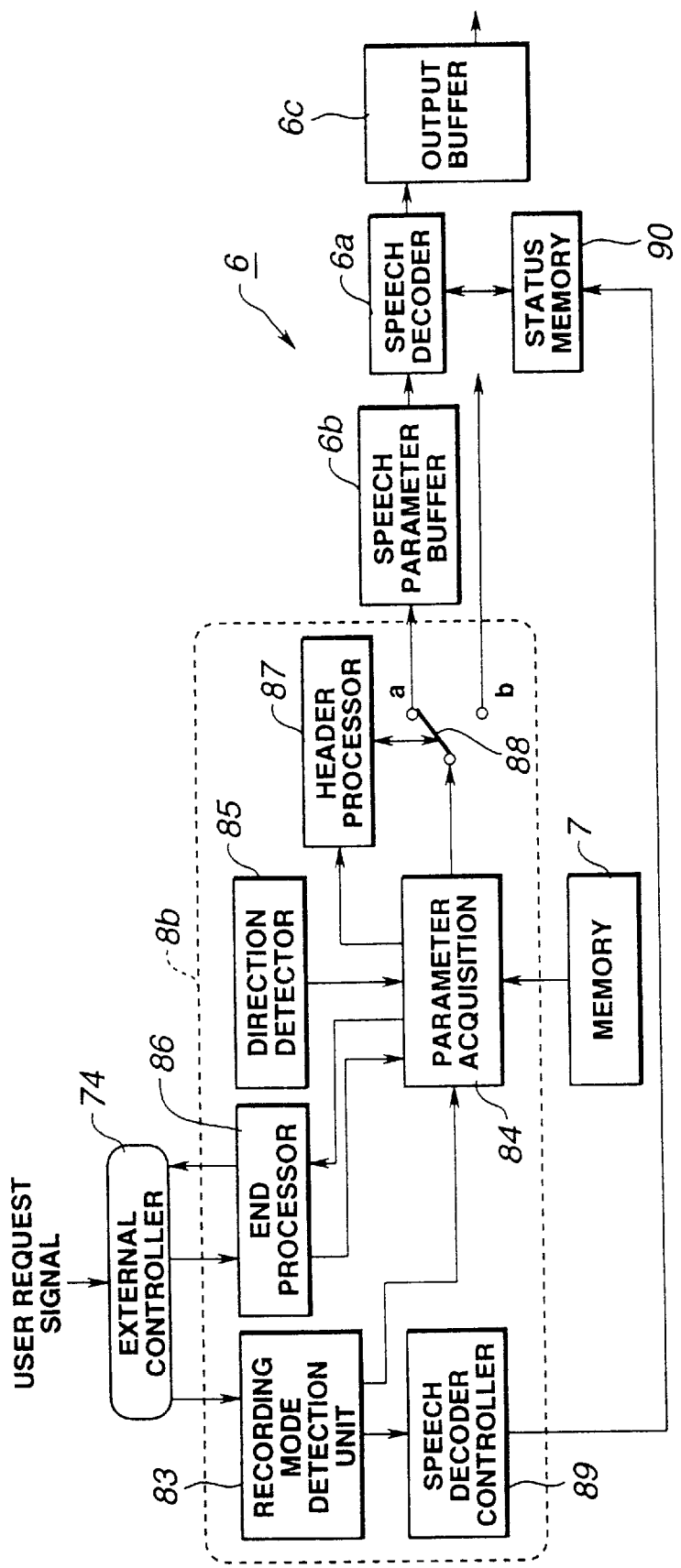
FIG. 8 is a functional block diagram showing a playback controller and a peripheral circuit of the recording/reproduction control unit.

The playback function of the portable telephone set is explained by referring to the flow chart of FIG. 7 and to the functional block diagram of FIG. 8. Reference is also had to FIGS. 1, 5 and 6 whenever the necessity arises.

It should be noted that the recording/playback controller 8 of FIG. 1 implements the recording function as later explained by software using CPU or DSP, and FIG. 8 represents the function in the form of functional blocks. FIG. 8 shows a playback controller 8b of the recording/playback control unit 8 of FIG. 1 and its peripheral circuit. Of course, the playback controller 8b of the recording/playback controller 8 may also be constituted by hardware as shown in FIG. 8.

The portable telephone set reproduces the speech with the aid of a changeover switch SW2 configured for selecting speech parameters supplied via the playback function portion of the recording/playback controller 8, such as the playback controller 8b of FIG. 8, from the memory 7 of FIG. 1, more generally the code data, and a speech decoding circuit 6a of the speech decoding circuit 6a of the speech decoding unit 6 configured for restoring speech parameters to speech signals.

The speech decoding unit 6 includes a block for acquiring speech parameters from the memory 7 and a block for restoring the speech parameters into the original speech. These two blocks are provided with a co-owned memory space on the RAM as a speech parameter buffer. The RAM processing corresponding to the former block is writing, while the RAM processing corresponding to the later block is readout. In the present invention, only the writing is termed the playback function (playback routine) of the portable telephone set. This function is implemented by the playback routine which is now to be explained.

Similarly to the above-described recording routine, the playback routine also has the state proper to it. The state specifying the non-playback state is 0, while the state specifying the playback state is other than 0.

By the key actuation by the user, a user request signal is supplied via a control unit of the portable telephone set, such as an external controller 74, to a playback controller 8b of the recording/playback controlling unit. The playback controller 8b sets the single or dual flag at a pre-set position responsive to the playback request signal. The playback routine is then accessed.

The accessed playback routine checks the state of the playback function at step S40. If, at step S40, the current state is 0 (YES), the playback controller transfers to step S41. If the current state is not 0 (NO), the playback controller transfers to step S42.

At step S41, the playback pointer PB__P is initialized.

At the next step S42, the state value st is incremented by 1, before the playback controller transfers to step S43 (st$^{++}$).

At step S43, it is judged, based upon the value of the flag set in the recording/playback controller, whether or not the reproduction is single or dual. If setting is for single playback (single), the playback controller transfers to step S44 for skipping the header information of the speech parameters which is not required for the present case. The playback controller transfers to step S45 where the speech parameters acquired from the memory 7, more generally the code data, are restored.

That is, in FIG. 8, the parameters from the memory 7 are acquired at step S45 by a parameter acquisition unit 84, while restoration is effectuated by a speech decoding circuit 6a of the speech decoder 6. Specifically, the speech parameters from the parameter acquisition unit 84 are sent via a changeover switch 88 as later explained to a speech parameter buffer 6b from which the speech parameters are restored or decoded by the speech decoder 6a and thence supplied to an output buffer 6c. The speech parameter buffer 6b, speech decoder 6a and the output buffer 6c correspond to the speech decoder 6. An output of the output buffer 6c is fed to the D/A converter 9.

At step S46, the value of the data flag df specifying the operation of the speech decoding circuit 6a is set to 1. After this setting, the end processing downstream of the step S47 as later explained is performed via the connector B. The end processing is carried out by the end processor 86.

If dual reproduction is specified at step S43, the playback controller transfers to step S51. The direction is judged at step S51 depending upon whether or not the state value st is odd. This operation is carried out by a direction detector 85. As explained in connection with the recording routine by referring to FIG. 5, the data sort stored in the memory 7 is discriminated based upon the state value. If the state value st is odd at this step, the direction is determined as being an uplink and the playback controller transfers to step S52.

At step S52, it is judged whether or not 1 is set in the lower most bit of the header. That is, it is judged whether or not the logical product of the lower most bit of the header and 1 (hd & 1) is true. If this condition is true (YES), the direction is determined as being uplink side and the playback controller transfers to step S53. At step S53, the speech parameter restoration similar to that performed at step S45 is effectuated by the speech decoder 6a, before the playback controller transfers to step S54.

With the arrangement of FIG. 8, it is determined whether or not 1 has been set in the lower most bit of the header by a header processor 87. The changeover switch 88 is controlled depending upon the result of judgment. That is, if the above condition is met (YES), the changeover switch 87 has its movable contact moved to a fixed terminal a so that the speech parameters from the parameter acquisition unit 84 is supplied via the speech parameter buffer 6b to the speech decoder 6a for restoring or decoding the speech parameters.

At step S54, the playback controller sets the value of the decoder flag df to 1, before transferring to step S56.

If 1 is not set at step S52 in the lower most bit (NO), that is if the condition is not met, the playback controller transfers to step S55.

At step S55, the playback controller sets the value of the decoder flag df to 0 specifying the stop of the speech decoding circuit 6a, before transferring to step S56.

With the present portable telephone set, the dual playback may be realized by performing the decoding twice on end. Since the filter state on the uplink side differs from that on the downlink side, the filter state is switched at the step S56 to the uplink side. This is effectuated by a speech decoding controller 89 changing over the filter state in the state memory 90 of the speech decoder 6a. The playback routine is terminated after changeover setting of the filter state.

If the result of judgment at step S51 is not odd (NO), the direction is determined as being downlink side. The playback controller then transfers to step S57.

At step S57, it is determined whether or not 1 has been set in the second lower most bit of the header, that is whether or not the logical product of the second lower most header bit and 1 is true. This is effectuated by the header processor 87. This condition is met (YES) when the lower two header bits are 2 or 3 (YES). The direction is then found to be downlink side and the playback controller transfers to step S58. At step S58, the speech parameters are restored in the same way as at steps S45 or S53 before the playback controller transfers to step S59.

At step S59, the value of the data flag df is set to 1 before the playback controller transfers to step S60.

If, at step S57, if is not set in the second lower most bit (NO), that is if the condition is not met, the playback controller transfers to step S61.

At step S61, the value of the decoder flag df is set to 0 before the playback controller transfers to step S60.

At step S60, the filter state is switched to the downlink side for matching the filter state, as at step S56. This is effectuated by the speech decoder controller 89 changing over the filter state of the state memory 90.

After the step S60, the playback controller transfers to step S47 for effectuating end processing via a connector B.

At step S47, it is judged whether or not there is a playback stop request from the user. If there is no playback stop request (NO), the playback controller transfers to step S48 in order to judge whether or not the value of n_hd after the next frame header is 0.

If, at step S48, the value of the next frame header n_hd is not 0 (NO), the playback controller transfers to step S49. At step S49, the value of the playback pointer PB_P is updated to complete the playback routine.

If there is the playback stop request at step S47 (YES), the playback controller transfers to step S50. Also, if the value of the next frame header n_hd is 0 at step S48, the playback controller transfers to step S50.

At step S50, the end flag sent from the recording/playback controller 8 to the control unit of the portable telephone set is set, and the state value is set to 0. The playback routine is terminated after this setting at step S50.

The end processing at steps S47 to S50 is effectuated by the end processor 86.

By the above operation, no alien feeling is incurred in the dual speech reproduction.

The manner in which direction-dependent recording is effectuated by the memory with the portable telephone set is explained by referring to the communication waveform of FIG. 9.

A typical communication waveform on the downlink (receiving) side, representing the communication from a base station to a terminal, such as a portable telephone set, is shown in FIG. 9A. A typical communication waveform on the uplink (transmitting) side, representing communication from the terminal to the base station, is shown in FIG. 9B. These communication waveforms are divided into plural communication sections (a to k) with lapse of time.

Referring to FIG. 9, the manner in which the portable telephone set performs single or dual recording on the memory 7 of FIG. 1 on the uplink side and on the downlink side in each section of the communication period is explained.

If the single recording of the bidirectional speech is selected, since the input signal has not reached a pre-set energy level at section a, the portable telephone set stores a signal indicating the duration of the silent state in the memory 7.

Since there is the speech signal in the downlink side at section b, encoded data of the parameter format on the downlink side, that is the parameters shown in FIGS. 4A and 4C, are recorded in the memory 7 in the compressed state as shown in FIGS. 4b and 4D.

The section c indicates the so-called double talk state in which there is the speech signal in each of the downlink and uplink sides. If the method of giving priority to the downlink side, or the trailing end of the speech, is adopted, the portable telephone set records the speech parameters supplied from the downlink side under compressed state. If the method of giving priority to the leading end of the speech, the portable telephone set records the speech parameters supplied from the uplink side under compressed state.

Since there is the speech signal only on the uplink side in the section d, the uplink side speech parameters are recorded under compressed state.

In the section e, there is a double talk section in which there are speech signals in both links. If such algorithm is employed in which the energy levels of both speech signals are compared to each other and the speech signal with a higher energy level is recorded, the uplink side speech is recorded in the section e, as is apparent from FIG. 9.

With the use of the above algorithm, the portable telephone set records under compression the voiced speech parameters on the uplink side under compressed state during the section f, while recording a signal indicating the length of the silent state during the section h. The portable telephone set also records voiced speech parameters derived from the downlink side under compressed state during the section h, while recording the downlink side speech parameters with the higher energy level based upon comparison of the speech signal levels during the section i. The portable telephone set also records voiced speech parameters derived from the downlink side under compressed state during the section j, while recording a signal indicating the duration of the silent state during the section k.

If the dual recording of the communication waveform shown in FIG. 9 is done by the portable telephone set, double talk occurs in the sections c, e and i. For recording both sides, the portable telephone set redoubles the write rate into the memory 7 and effects recording by time-divisional multiplexing.

Therefore, when reproducing the recording for these sections, the portable telephone set feeds the time-divisional multiplexed data, read out from the memory 7, to the same DSP and demultiplexes the data to give uplink side and downlink side data, and proceeds to decode both side data.

The portable telephone set digitally sums the resulting data and sends the resulting data to the D/A converter for converting the signals into analog signals which are simultaneously reproduced and outputted from the speaker.

During the sections a, g and k, both the downlink and uplink sides are silent. In such case, the portable telephone set records a signal specifying the duration of the silent period under compressed state. This leads to saving in the memory.

In addition, in the similar silent state, it is also possible to record speech parameters having a shorter duration of the silent period following the speech period. This also achieves saving in the memory capacity.

By the above constitution, speech data may be recorded in the memory more efficiently than with the conventional solid-state recording without the necessity of annexing circuits, thus enabling automatic answering recording and memo recording.

In addition, the speech of the uplink and downlink side networks may be efficiently recorded with a bit rate corresponding to substantially one network.

Figure 10:
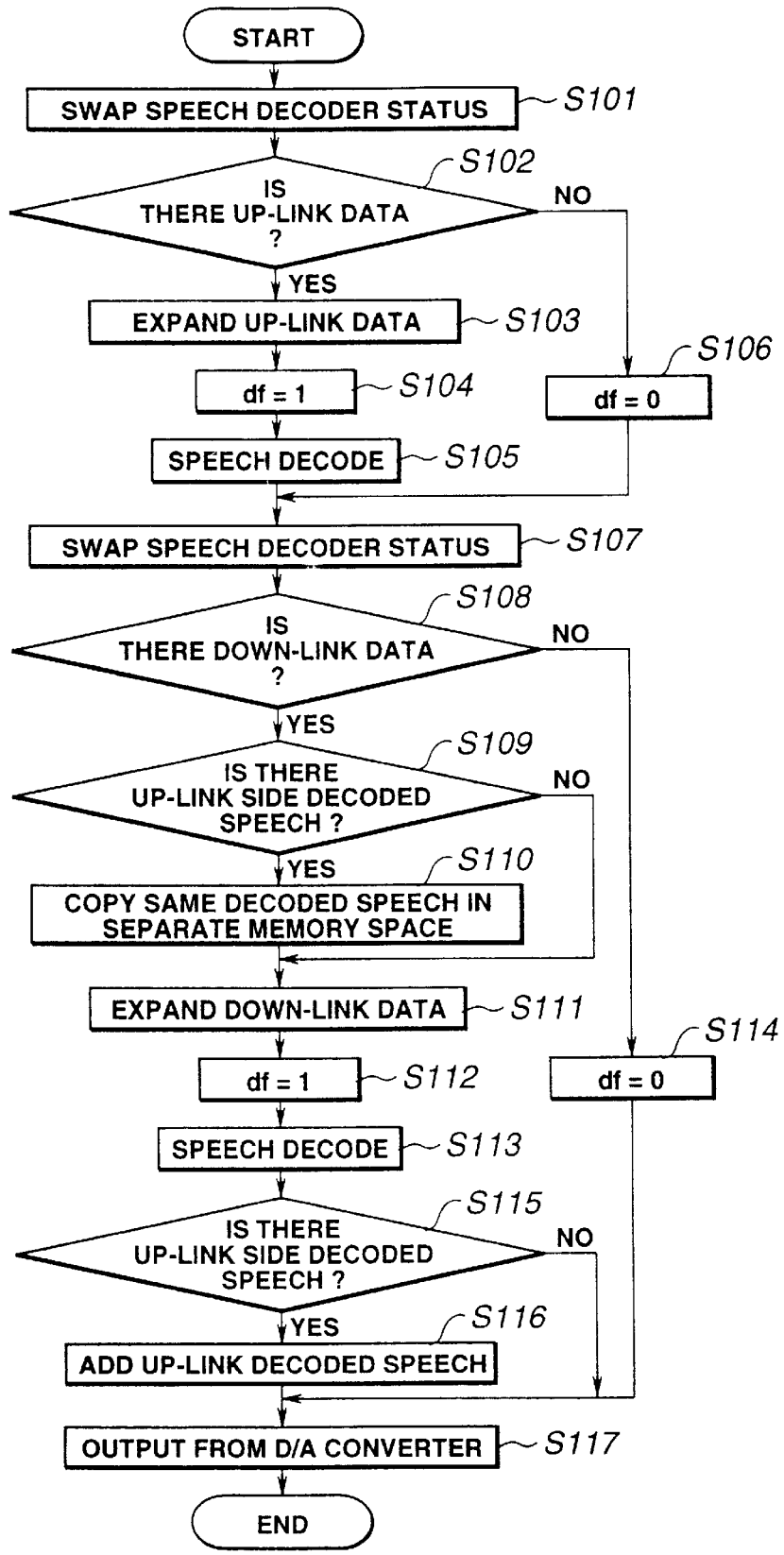
FIG. 10 is a flow chart for illustrating a typical example of the operation of speech decoding when the bidirectional speech signals are recorded on a memory.

An illustrative example of speech decoding in the sequence of the uplink and downlink sides in case of the dual speech being recorded in the memory 7 is explained in detail by referring to FIG. 10 and occasionally to FIGS. 1 and 7 to 9.

If, in FIG. 10, a playback control routine is accessed, the speech decoding controller 89 shifts at step S101 the state of the speech decoding circuit 6a to another memory, such as a state memory 90, and sets its own state, by way of so-called swapping. Thus the speech decoding circuit 6a has two channel states, that is the uplink channel state and the downlink channel state.

At the next step S102, the speech decoding circuit checks the possible presence of the uplink side data by the header processor 87, based upon the header produced from the recording memory 7 via the parameter acquisition unit 84. If there is data, the speech decoding circuit expands the parameters, written under compressed state in the memory 7 as shown in FIGS. 4B and 4D, and takes out the expanded data, as shown in FIGS. 4A and 4C, at step S103. The speech decoding circuit sets 1 in the decoder flag df at step S104. Since the df value is 1, the speech decoding unit decodes or restores the speech by the speech decoder 6a at step S105 before transferring to step S107. If it is found at step S102 that there is no uplink data, the speech decoding circuit sets the decoder flag df to 0 at step S106 and, since the df value is 0, the speech decoding circuit transfers to step S107 without decoding the speech.

At step S107, the speech decoding circuit performs a swapping operation similar to that performed at step S101. However, in this case, the state of the speech decoding circuit 6a is transferred from the uplink state to the downlink state.

At the next step S108, the speech decoding circuit checks whether or not there is the downlink data by the header processor 87 based upon the header, as at the step S102. If there is the downlink data, the speech decoding circuit transfers to step S109 in order to check whether or not there is any decoded signal on the uplink side. If there is any such decoded data, the speech decoding circuit duplicates the decoded speech from the output buffer 6c to a refuge memory space at step S110 before transferring to step S111. If there is no such data, the speech decoding circuit directly transfers to step S111.

At step S111, as at step S103, the speech decoder expands and takes the parameters, which are downlink data, from the memory 7, and sets 1 in a data flag df at step S112. At step S113, the speech decoding circuit causes the speech decoder 6a to decode or restore the speech before transferring to step S115.

At step S115, the speech decoding circuit discerns whether or not the uplink side decoded speech is present in the output buffer 6c. if there is such decoded data, the speech decoding circuit transfers to step S116 to sum the uplink decoded speech and the downlink side decoded speech obtained at step S113 to produce double talk decoded speech before transferring to step S117. If it is found at step 115 that there is no uplink side decoded speech, the speech decoding circuit directly transfers to step S117.

If it is found at step S108 that there is no downlink data, 0 is set in the decoder flag df at step S114. The speech decoding circuit then transfers to step S117.

At step S117, the decoded speech data is sent from the output buffer 6c to the D/A converter 9 of FIG. 1 and thereby converted into analog signals which are outputted.

With the above-described speech signal transmission/ reception apparatus, speech data may be recorded in the memory more efficiently than with conventional solid-state recording for realizing automatic answering and recording and memo recording without annexing additional circuits.

In addition, the speech of the uplink and downlink side networks may be efficiently recorded with a bit rate corresponding to approximately one network.

We claim:

1. A speech signal transmitting/receiving apparatus comprising:

compressing and encoding means for compressing and encoding an input speech signal;

transmitting means for transmission processing an output signal of said compressing and encoding means;

receiving means for reception processing a received signal;

expanding and decoding means for expanding and decoding an output signal of said receiving means and outputting a speech signal;

storage means for storing at least one of a signal from said compressing and encoding means and a signal to said expanding and decoding means; and control means for controlling writing of at least one of the output signal from said compressing and encoding means and the signal to said expanding and decoding means and for controlling a readout operation from said storage means, wherein said control means judges whether a dual recording mode prevails, based upon at least one of the output signal from said compressing and encoding means and the signal to said expanding and decoding means and, upon fudging a presence of the dual recording mode, said control means causes uplink side and downlink side signals to be stored in said storage means and when reading out signals stored in said storage means, said control means causes the unlink side and downlink side signals to be read out separately and sums the unlink side and downlink side signals read out separately to output a summed signal.

2. The signal transmitting/receiving apparatus as claimed in claim 1, wherein if at least one of the output signal from said compressing encoding means stored in said storage means and the signal to said expanding and decoding means are in a silent state, said control means inhibits storage of at least one of the output signal from said compressing and encoding means and the signal to said expanding and decoding means.

3. The signal transmitting/receiving apparatus as claimed in claim 1, wherein if at least one of the output signal from said compressing and encoding means and the signal to said expanding and decoding means are in the silent state, said control means stores a signal indicating a silent period in said storage means.

4. The signal transmitting/receiving apparatus as claimed in claim 3, wherein said control means includes detection means for detecting the silent state of at least one of the output signal from said compressing and encoding means and the signal to said expanding and decoding means, said control means causing a signal indicating the silent period to be stored in said storage means based upon results of detection from said detection means.

5. The signal transmitting/receiving apparatus as claimed in claim 1, wherein if said control means detects an occurrence of double talk, said control means causes at least one of uplink side and downlink side signals to be stored in said storage means.

6. The signal transmitting/receiving apparatus as claimed in claim 1, wherein if said control means detects an occurrence of double talk, said control means causes one of the uplink side and downlink side signals which has a higher energy level of the speech signal to be stored in said storage means.

7. The signal transmitting/receiving apparatus as claimed in claim 1, wherein if said control means detects an occurrence of double talk, said control means causes the uplink side and downlink side signals to be stored in said storage means at a write speed faster than a write speed of storing one of the uplink side and downlink side signals in said storage means.

8. A speech signal transmitting/receiving apparatus comprising:

compressing and encoding means for compressing and encoding an input speech signal;

transmitting means for transmission processing an output signal of said compressing and encoding means;

receiving means for reception processing a received signal;

storage means for storing at least one of code data of signals compressed and encoded by said compressing and encoding means and code data of signals received by said receiving means;

expanding and decoding means for expanding and decoding the code data of an output signal of said storage means for outputting a speech signal; and control means for controlling writing of at least one of the code data of the output signal from said compressing and encoding means and the code data of the signal to said expanding and decoding means and for controlling a readout operation from said storage means, wherein said control means Judges whether a dual recording mode prevails, based upon at least one of the output signal from said compressing and encoding means and the signal to said expanding and decoding means and, upon judging a presence of the dual recording mode, said control means causes unlink side and downlink side signals to be stored in said storage means and when reading out signals stored in said storage means, said control means causes the unlink side and downlink side signals to be read out separately and sums the unlink side and downlink side signals read out separately to output a summed signal.

9. The signal transmitting/receiving apparatus as claimed in claim 8, wherein if at least one of the output signal from said compressing and encoding means stored in said storage means and the signal to said expanding and decoding means are in a silent state, said control means inhibits storage of at least one of the output signal from said compressing encoding means and the signal from said expanding decoding means.

10. The signal transmitting/receiving apparatus as claimed in claim 8, wherein if at least one of the output signal from said compressing and encoding means and the signal to said expanding and decoding means are in a silent state, said control means stores a signal indicating a silent period in said storage means.

11. The signal transmitting/receiving apparatus as claimed in claim 10, wherein said control means includes detection means for detecting the silent state of at least one of the output signal from said compressing and encoding means and the signal to said expanding and decoding means, said control means causing a signal indicating the silent period to be stored in said storage means based upon results of detection from said detection means.

12. The signal transmitting/receiving apparatus as claimed in claim 11, wherein said detection means includes first detection means for detecting the silent state of the output signal from said compressing and encoding means and second detection means for detecting the silent state of the signal to said expanding and decoding means.

13. The signal transmitting/receiving apparatus as claimed in claim 12, wherein said control means is responsive to results of detection by said first and second detection means to cause one of the output signal from said compressing and encoding means and the signal to said expanding and decoding means having a shorter duration of a silent period to be stored in said storage means.

14. The communication device as claimed in claim 12, wherein said first and second detection means are each constituted by count means.

15. The signal transmitting/receiving apparatus as claimed in claim 8, wherein if said control means detects the occurrence of double talk, said control means causes one of the uplink side and downlink side signals which has a higher energy level of the speech signal to be stored in said storage means.

16. The signal transmitting/receiving apparatus as claimed in claim 8, wherein if said control means detects the occurrence of double talk, said control means causes the uplink side and downlink side signals to be stored in said storage means at a write speed faster than the write speed at a time of storing one of the uplink side and downlink side signals in said storage means.

17. The signal transmitting/receiving apparatus as claimed in claim 8, wherein at least one of code data of a signal compressed and encoded by said compressing and encoding means and code data further compressed from the code data of the signal received by said receiving means are stored in said storage means.

18. A speech signal transmitting/receiving apparatus comprising:

compressing and encoding means for compressing and encoding an input speech signal;

transmitting means for transmission processing an output signal of said compressing and encoding means;

receiving means for reception processing a received signal;

expanding and decoding means for expanding and decoding an output signal of said receiving means for outputting a speech signal;

storage means for storing at least one of a signal from said compressing and encoding means and a signal to said expanding and decoding means; and control means for controlling writing of at least one of the signal from said compressing and encoding means and the signal to said expanding and decoding means and for controlling the readout operation from said storage means;

wherein uplink side and downlink side signals are separately stored in said storage means, said control means separately reading out the uplink side signals stored in said storage means at a time point of occurrence of double talk and summing the uplink side and downlink side signals by said expanding and decoding means.

19. The signal transmitting/receiving apparatus as claimed in claim 18, wherein if said control means detects the occurrence of double talk, said control means causes the uplink side and downlink side signals to be stored in said storage means at a write speed faster than a write speed at a time of storing one of the uplink side and downlink side signals in said storage means.

20. The communication device as claimed in claim 18, wherein if said control means detects the occurrence of double talk, said control means causes one of the uplink side and downlink side code data of the speech signal which has a higher energy level of the speech signal to be stored in said storage means.

21. The communication device as claimed in claim 18, wherein if said control means detects the occurrence of double talk, said control means causes the uplink side code data to be preferentially stored in said storage means.

22. The signal transmitting/receiving apparatus as claimed in claim 18, wherein at least one of code data of the signal from said compressing and encoding means and code data of the signal to said expanding and decoding means are stored in said storage means.

23. The signal transmitting/receiving apparatus as claimed in claim 22, wherein at least one of code data of a signal compressed and encoded by said compressing and encoding means and code data further compressed from the code data of the signal to said expanding and decoding means are stored in said storage means.

* * * * *